(12) United States Patent
Raymond et al.

(10) Patent No.: US 10,313,450 B2
(45) Date of Patent: Jun. 4, 2019

(54) METHOD FOR TRANSPARENTLY CONNECTING AUGMENTED NETWORK SOCKET OPERATIONS

(71) Applicant: HEWLETT PACKARD ENTERPRISE DEVELOPMENT LP, Houston, TX (US)

(72) Inventors: Michael Andrew Raymond, Eagan, MN (US); Andy Warner, Edina, MN (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 113 days.

(21) Appl. No.: 15/227,502

(22) Filed: Aug. 3, 2016

(65) Prior Publication Data

US 2017/0041402 A1 Feb. 9, 2017

Related U.S. Application Data

(63) Continuation of application No. 13/843,810, filed on Mar. 15, 2013, now Pat. No. 9,438,638.

(51) Int. Cl.
*H04L 29/08* (2006.01)
*H04L 29/06* (2006.01)
*G06F 9/54* (2006.01)

(52) U.S. Cl.
CPC .......... *H04L 67/141* (2013.01); *G06F 9/544* (2013.01); *H04L 65/1069* (2013.01); *H04L 69/162* (2013.01); *H04L 67/10* (2013.01)

(58) Field of Classification Search
CPC .... H04L 65/1069; H04L 69/162; G06F 9/544
See application file for complete search history.

(56) References Cited

U.S. PATENT DOCUMENTS

| | | | |
|---|---|---|---|
| 7,210,169 B2* | 4/2007 | Smith | H04L 63/083 709/228 |
| 7,406,473 B1* | 7/2008 | Brassow | G06F 17/30067 |
| 7,610,348 B2* | 10/2009 | Kisley | G06F 3/061 709/212 |
| 7,640,346 B2 | 12/2009 | Ottaviani et al. | |
| 7,849,196 B2 | 12/2010 | Gkantskidis et al. | |

(Continued)

OTHER PUBLICATIONS

U.S. Appl. No. 13/843,810 Final Office Action dated Feb. 5, 2016.

(Continued)

*Primary Examiner* — Backhean Tiv

(57) ABSTRACT

A method at one or more computers having memory and one or more processors includes detecting establishment of a connection between a first process and a second process; determining whether an augmented communications service is available for the connection between the first process and second process; in accordance with a determination that the augmented communications service is available, configuring the connection between the first process and the second process to make use of the augmented communications service with no modification to the executable codes of the first process and the second process; and in accordance with a determination that the augmented communications service is not available, configuring the connection between the first process and the second process to make use of a non-augmented communications service.

18 Claims, 7 Drawing Sheets

(56) References Cited

U.S. PATENT DOCUMENTS

| | | | |
|---|---|---|---|
| 8,209,704 B1* | 6/2012 | McCann | G06F 9/545 |
| | | | 711/130 |
| 8,359,603 B1* | 1/2013 | McCann | G06F 9/547 |
| | | | 719/312 |
| 9,438,638 B2* | 9/2016 | Raymond | H04L 65/1069 |
| 2001/0056492 A1* | 12/2001 | Bressoud | H04L 29/06 |
| | | | 709/227 |
| 2002/0124089 A1 | 9/2002 | Aiken et al. | |
| 2002/0152060 A1* | 10/2002 | Tseng | G06F 13/22 |
| | | | 703/17 |
| 2003/0046542 A1* | 3/2003 | Chen | G06F 21/445 |
| | | | 713/176 |
| 2004/0003085 A1 | 1/2004 | Joseph et al. | |
| 2004/0064694 A1* | 4/2004 | Lee | H04L 9/0844 |
| | | | 713/168 |
| 2005/0033777 A1* | 2/2005 | Moraes | G06F 17/30575 |
| 2005/0100113 A1* | 5/2005 | Corts | H04H 20/30 |
| | | | 375/295 |
| 2005/0138242 A1* | 6/2005 | Pope | G06F 9/544 |
| | | | 710/48 |
| 2005/0233737 A1* | 10/2005 | Lin | H04L 51/04 |
| | | | 455/416 |
| 2005/0260989 A1* | 11/2005 | Pourtier | G06F 21/53 |
| | | | 455/435.3 |
| 2006/0165074 A1* | 7/2006 | Modi | H04L 29/12367 |
| | | | 370/389 |
| 2008/0216160 A1* | 9/2008 | Rollet | G06F 21/33 |
| | | | 726/6 |
| 2008/0244738 A1* | 10/2008 | Shiozawa | G06F 21/6218 |
| | | | 726/21 |
| 2009/0220080 A1* | 9/2009 | Herne | H04L 63/0428 |
| | | | 380/255 |
| 2010/0142542 A1* | 6/2010 | Van Wie | H04L 65/1073 |
| | | | 370/400 |
| 2010/0146085 A1* | 6/2010 | Van Wie | H04L 12/00 |
| | | | 709/220 |
| 2010/0211780 A1* | 8/2010 | Mukkara | H04L 63/0823 |
| | | | 713/168 |
| 2010/0287618 A1* | 11/2010 | Howell | G06F 9/468 |
| | | | 726/26 |
| 2011/0289481 A1* | 11/2011 | Franklin | G06F 11/3668 |
| | | | 717/125 |
| 2012/0017213 A1* | 1/2012 | Hunt | G06F 21/53 |
| | | | 718/100 |
| 2013/0346739 A1* | 12/2013 | VanHeyningen | H04L 9/12 |
| | | | 713/153 |
| 2014/0075567 A1* | 3/2014 | Raleigh | H04W 12/10 |
| | | | 726/26 |
| 2014/0108668 A1* | 4/2014 | Zhang | H04W 76/10 |
| | | | 709/228 |
| 2014/0157387 A1* | 6/2014 | Lee | G06F 17/30309 |
| | | | 726/7 |
| 2014/0280984 A1* | 9/2014 | Raymond | H04L 65/1069 |
| | | | 709/227 |
| 2014/0282906 A1* | 9/2014 | Ignatchenko | H04L 9/3234 |
| | | | 726/4 |
| 2014/0282907 A1* | 9/2014 | Ignatchenko | H04L 9/3234 |
| | | | 726/4 |
| 2015/0150114 A1* | 5/2015 | Kuker | H04L 12/4641 |
| | | | 726/14 |
| 2016/0087933 A1* | 3/2016 | Johnson | H04W 4/70 |
| | | | 709/245 |
| 2017/0041402 A1* | 2/2017 | Raymond | H04L 65/1069 |

OTHER PUBLICATIONS

U.S. Appl. No. 13/843,810 Office Action dated May 19, 2015.
U.S. Appl. No. 13/856,394 Office Action dated Jul. 10, 2015.

* cited by examiner

METHOD FOR TRANSPARENTLY CONNECTING AUGMENTED NETWORK SOCKET OPERATIONS

CROSS-REFERENCE TO RELATED APPLICATIONS

This application is a continuation- and claims the priority benefit of U.S. patent application Ser. No. 13/843,810 filed Mar. 15, 2013, which is incorporated herein by reference in its entirety.

TECHNICAL FIELD

The disclosed embodiments relate generally to distributed computing.

BACKGROUND

The use of distributed computing has grown by leaps and bounds. By using multiple connected computers, a large amount of computing power can be brought to bear on massive computing tasks.

A bottleneck within a distributed computing system is communications between processes. Typically, processes exchange data through the operating system kernel, which incurs higher overheads, such as locks and protocol processing, and thus slow down performance. A way to bypass the operating system kernel is to exchange data through a shared memory space. Use of the shared memory space may be aided by an augmented communications service. The augmented communications service is useful only if the processes that are communicating with each other are using the service and know that the other process is using the service. A process may communicate with many other processes, and not all of them use the service. However, the processes themselves do not know which process uses the service and which does not. Without awareness of which process uses the service and which doesn't, the augment communications service is ineffective.

SUMMARY

In accordance with some embodiments, a method at one or more computers having memory and one or more processors includes detecting establishment of a connection between a first process and a second process; determining whether an augmented communications service is available for the connection between the first process and second process; in accordance with a determination that the augmented communications service is available, configuring the connection between the first process and the second process to make use of the augmented communications service with no modification to the executable codes of the first process and the second process; and in accordance with a determination that the augmented communications service is not available, configuring the connection between the first process and the second process to make use of a non-augmented communications service.

In accordance with some embodiments, a system includes one or more processors, memory, and one or more programs stored in the memory including instructions executable by the one or more processors to: detect establishment of a connection between a first process and a second process; determine whether an augmented communications service is available for the connection between the first process and second process; in accordance with a determination that the augmented communications service is available, configure the connection between the first process and the second process to make use of the augmented communications service with no modification to the executable codes of the first process and the second process; and in accordance with a determination that the augmented communications service is not available, configure the connection between the first process and the second process to make use of a non-augmented communications service.

In accordance with some embodiments, a computer readable storage medium storing one or more programs configured for execution by one or more computers with one or more processors and memory, the one or more programs comprising instructions to: detect establishment of a connection between a first process and a second process; determine whether an augmented communications service is available for the connection between the first process and second process; in accordance with a determination that the augmented communications service is available, configure the connection between the first process and the second process to make use of the augmented communications service with no modification to the executable codes of the first process and the second process; and in accordance with a determination that the augmented communications service is not available, configure the connection between the first process and the second process to make use of a non-augmented communications service.

BRIEF DESCRIPTION OF THE DRAWINGS

Like reference numerals refer to corresponding parts throughout the drawings.

DESCRIPTION OF EMBODIMENTS

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Reference will now be made in detail to various embodiments, examples of which are illustrated in the accompanying drawings. In the following detailed description, numerous specific details are set forth in order to provide a thorough understanding of the invention and the described embodiments. However, the invention may be practiced without these specific details. In other instances, well-known methods, procedures, components, and circuits have not been described in detail so as not to unnecessarily obscure aspects of the embodiments.

Figure 1:
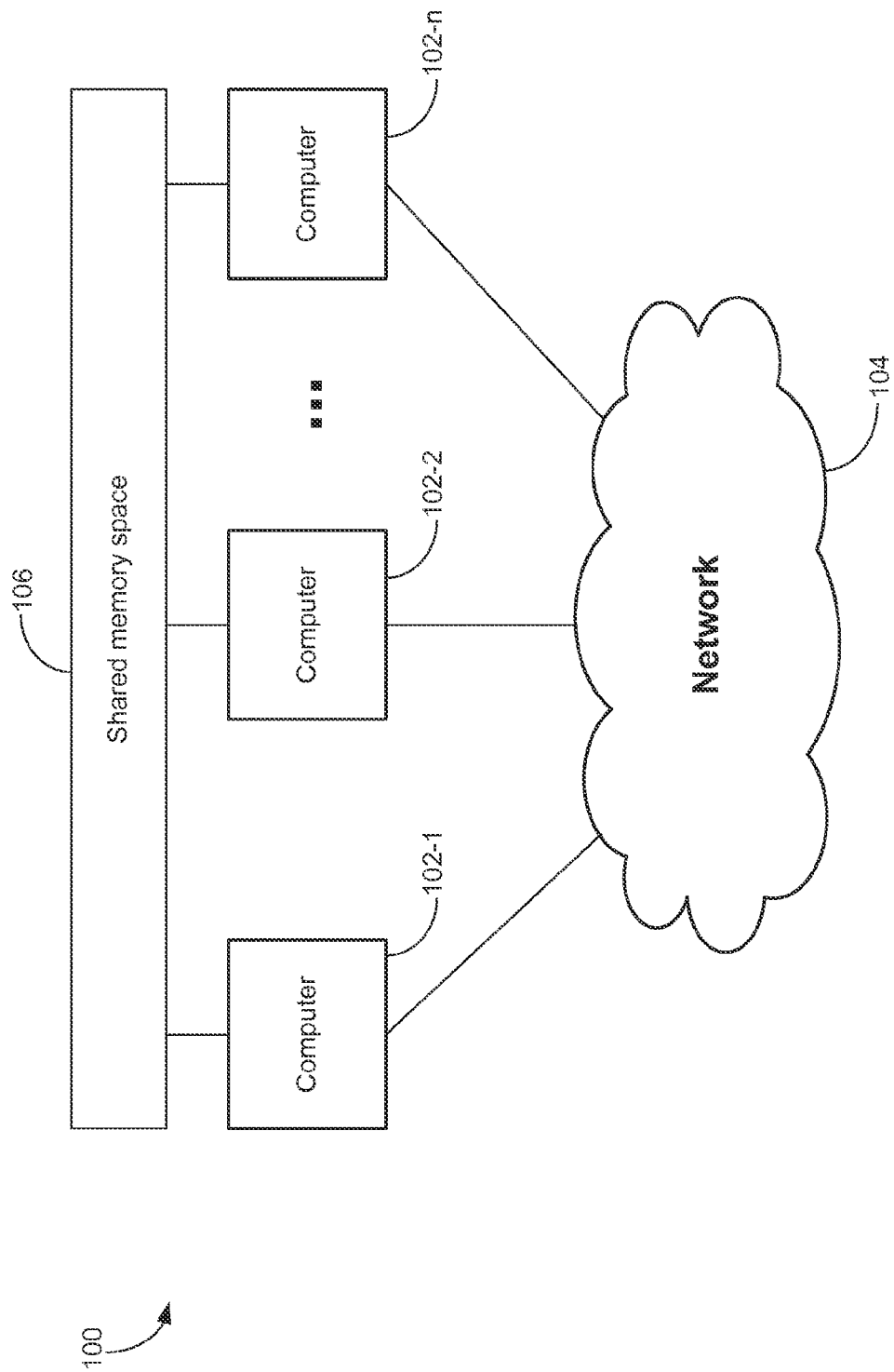
FIG. 1 illustrates a distributed computing environment in accordance with some embodiments.

FIG. 1 is a block diagram illustrating a distributed computing environment in accordance with some embodiments. Distributed computing system 100 includes multiple computers 102-1 thru 102-n communicatively coupled to each other through one or more network(s) 104. In some embodiments, distributed computing system 100 is a supercomputer system, a grid computing system, a parallel computing system, or a multi-computer network. In some embodiments, the respective computers 102 are servers. The network(s) 104 include one or more of local area networks, wide area networks, virtual private networks, the Internet, etc.

In some embodiments, distributed computing system 100 operates in a shared memory configuration. The computers 102 in the distributed computer system 100 access a shared memory space 106. The shared memory space 106 includes physical memory (e.g., volatile memory, such as random access memory (RAM); non-volatile memory) that is physically located at the respective computers 102; the physical memory located at the respective computers 102 are logically grouped together into a shared memory space 106 addressed by the processors at the computers 102 as a single memory space.

Figure 2:
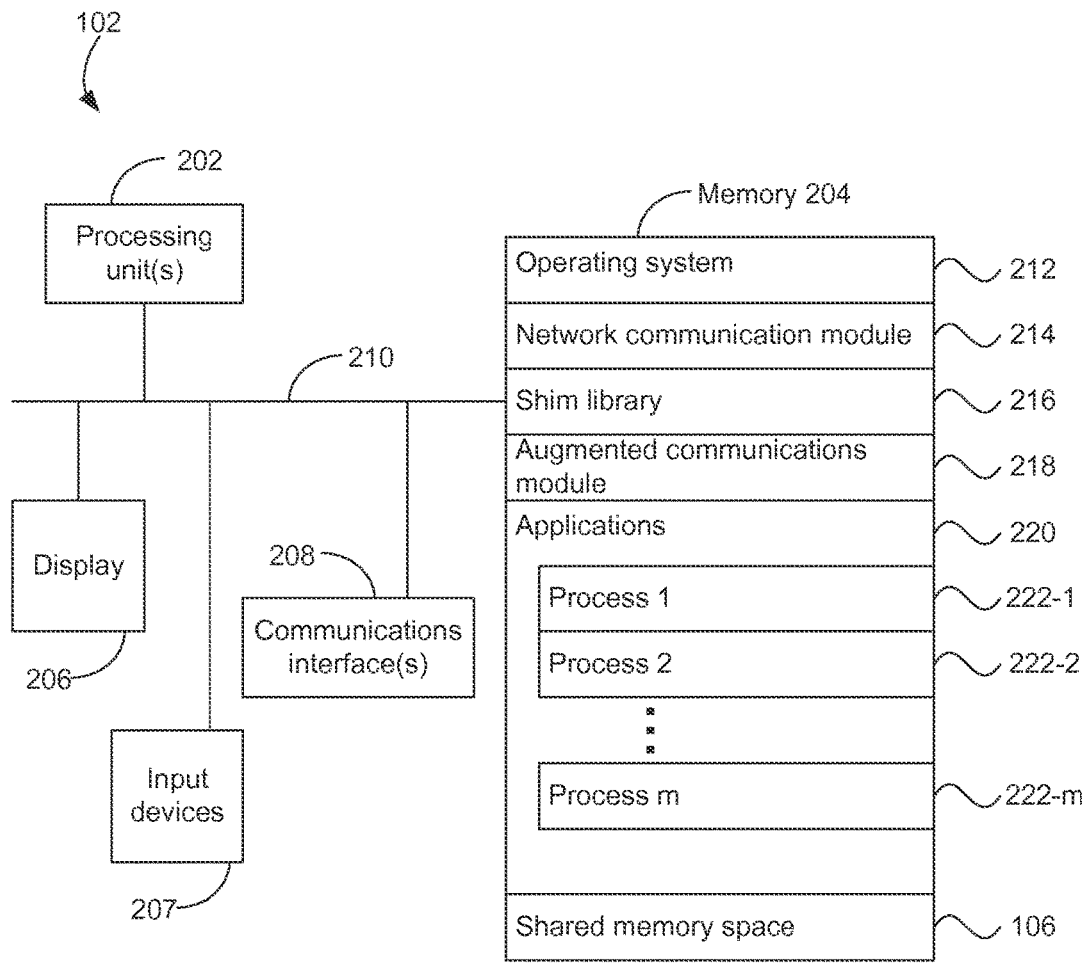
FIG. 2 is a block diagram illustrating a computer system in accordance with some embodiments.

FIG. 2 is a block diagram illustrating a computer 102 in accordance with some embodiments. A computer 102 typically includes one or more processing units (CPU's) 202 for executing modules, memory 204; one or more network or other communications interfaces 208; and one or more communication buses 210 for interconnecting these components. The communication buses 210 optionally include circuitry (sometimes called a chipset) that interconnects and controls communications between system components. The computer 102 optionally includes a user interface comprising a display device 206 and one or more input devices 207 (e.g., a keyboard, mouse). Memory 204 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 204 optionally includes one or more storage devices remotely located from the CPU(s) 202. Memory 204, or alternately the non-volatile memory device(s) within memory 204, comprises a non-transitory computer readable storage medium. In some embodiments, memory 204, or the computer readable storage medium of memory 204 stores the following programs, modules and data structures, or a subset thereof:

- an operating system 212 that includes procedures for handling various basic system services and for performing hardware dependent tasks;
- a network communication module 214 that is used for connecting the computer 102 to other computers via the one or more communication network interfaces 208 (wired or wireless) and one or more communication networks, such as the Internet, other wide area networks, local area networks, metropolitan area networks, and so on;
- a shim library 216 for intermediating between processes 222 of applications 220 to determine whether processes 222 attempting inter-process communication can make use of an augmented communications service;
- augmented communications module 218 for performing inter-process communications through an augmented communications service;
- one or more applications 220, which include one or more processes 222-1 thru 222-m; and
- shared memory space 106.

Shared memory space 106 is a memory space that is accessible to computers 102. In some embodiments, respective portions (not shown) of memory 204 in multiple respective computers 102 in the distributed computing system 100 are reserved and logically combined into the shared memory space 106 accessible to the computers 102 in the distributed computing system 100.

Figure 3:
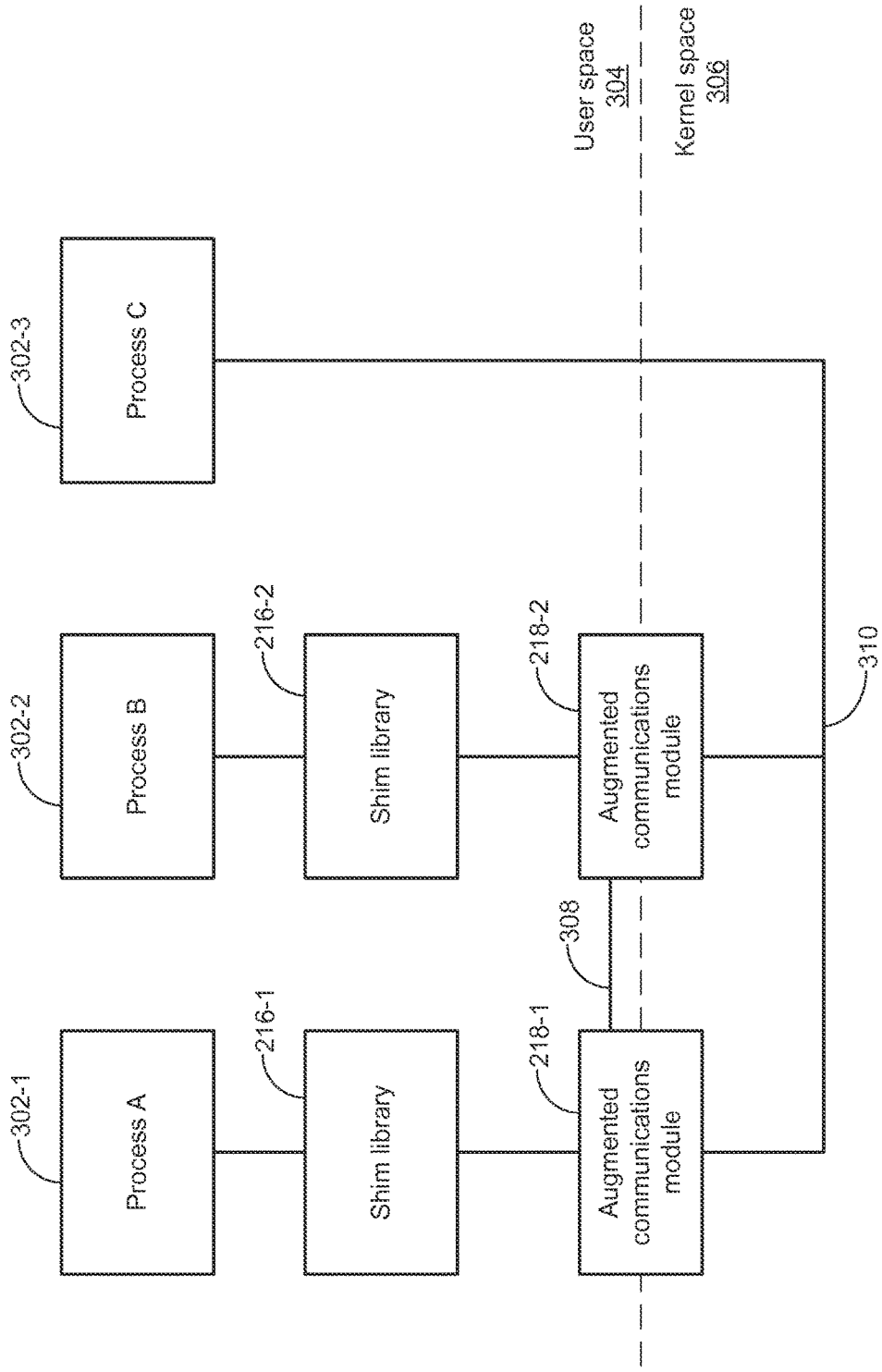
FIG. 3 is a conceptual diagram illustrating processes in communication with each other in accordance with some embodiments.

The augmented communications service facilitates augmented (e.g., faster) inter-process communications between processes 222. In some embodiments, the augmented communications service uses the shared memory space 106 to facilitate augmented inter-process communications. Inter-process communications using the augmented communications service is performed in a user space 304 (FIG. 3), and thus is faster compared to the same inter-process communications done in the kernel space 306 (FIG. 3). The augmented communications service is transparent to the applications 220 and processes 222; applications 220 and processes 222 are not modified, coded, or configured to specifically use the augmented communications service for inter-process communication, and processes 222 connect with each other using well-known methods (e.g., socket calls). In other words, for a given inter-process communication, the processes involved do not know if the opposite process is using the augmented communications service and can't determine same. Thus, a shim library 216 process acts as an intermediary that sets up the augmented communication service between connecting processes, or to fall back to non-augmented communications (e.g., conventional inter-process communications methods, such as inter-process communications in a kernel space, TCP sockets over Ethernet, etc.). Other examples of augmented communications include communication over InfiniBand using InfiniBand application programming interfaces.

In some embodiments, not all computers 102 in the distributed computing system include the shim library 216 and the augmented communications module 218. Processes running at computers 102 that do not include the shim library 216 and the augmented communications module 218 are not able to user the augmented communications service. The shim library 216 for a process determines if an opposite process is running at a computer 102 without the augmented communications service, and if so, sets up a non-augmented connection to the process.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise rearranged in various embodiments. In some embodiments, memory 204 may store a subset of the modules and data structures identified above. Furthermore, memory 204 may store additional modules and data structures not described above.

FIG. 3 illustrates a conceptual diagram of inter-process communications in accordance with some embodiments. FIG. 3 illustrates processes 302-1, 302-2, and 302-3 (e.g., any of processes 222) running in a distributed computing system 100. Processes 302-1, 302-2, and 302-3 can be running at the same computer 102 or at respective computers 102 within distributed computer system 100. Processes 302-1 thru 302-3 run in user space 304. A process of shim library 216-1 intercepts the calls by process 302-1 (e.g., intercepts the calls by process 302-1 to standard communication libraries). A process of shim library 216-2 intercepts the calls by process 302-2.

When process 302-1 attempts to connect with process 302-2 and process 302-2 listens for the connection (or vice versa), processes of shim libraries 216-1 and 216-2 intercept the connection establishment communications between the processes 302-1 and 302-2 and mediates the establishment of the connection in order to determine whether the augmented communications service is to be used for the connection. If the augmented communications service is to be used, the connection is configured to use the service; the inter-process communications between process 302-1 and 303-2 takes place 308 in the user space 304 (e.g., in shared memory space 106). If the augmented communications service is not to be used, the connection is configured to not use the service; the inter-process communications between process 302-1 and 303-2 takes place 310 in the kernel space 306.

Similarly, when process 302-1 or 302-2 attempts to connect with process 302-3, processes of shim libraries 216-1 or 216-2, respectively, mediate the establishment of the connection in order to determine whether the augmented communications service is to be used for the connection. Processes of shim library 216-1 or 216-2 determine that the augmented communications service is not available for process 302-3, and thus inter-process communications between process 302-1 or 302-2 and process 302-3 takes place 310 in the kernel space 306 or by other conventional methods.

Figure 4:
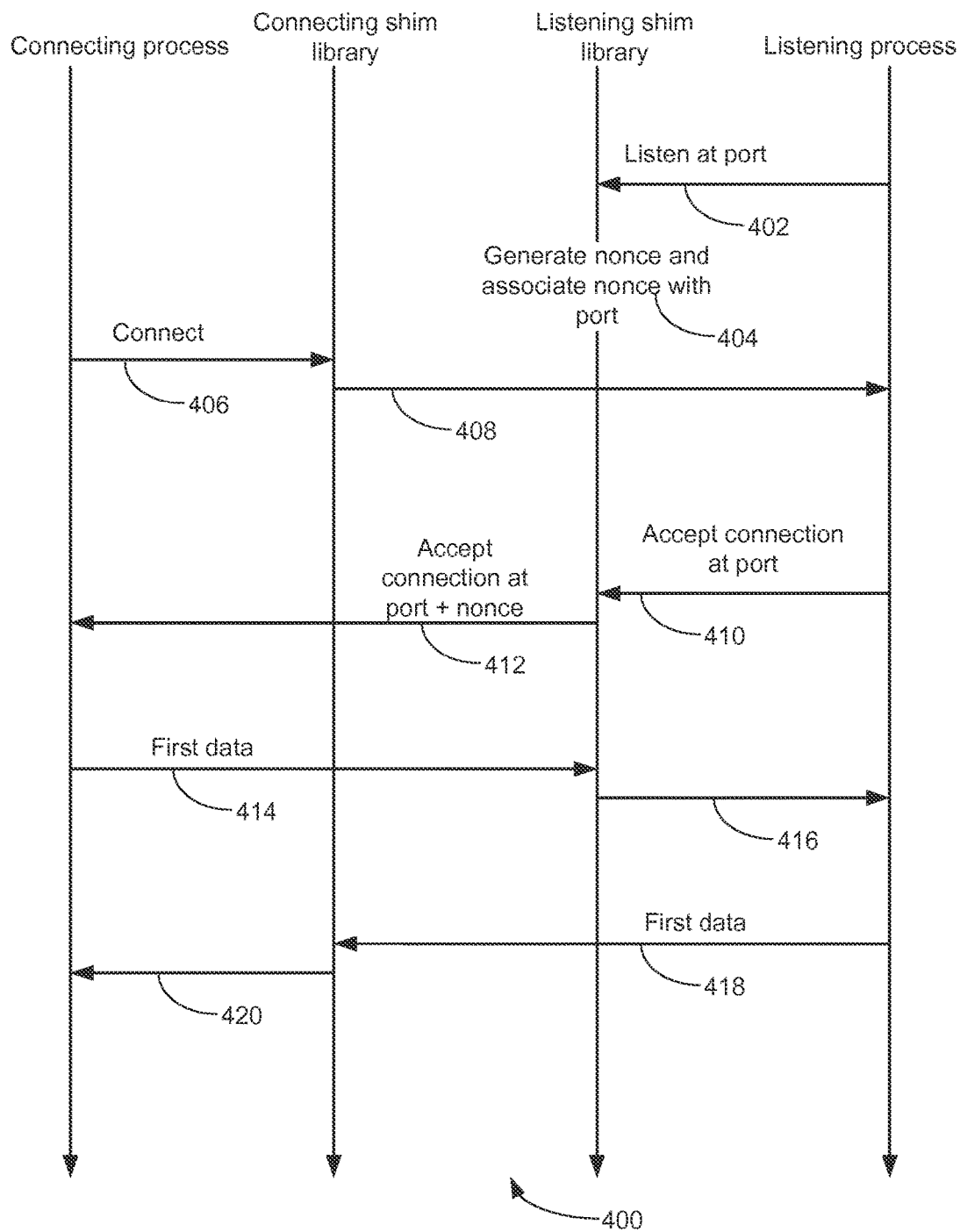
FIG. 4 is a diagram illustrating a process for transparently connecting processes in accordance with some embodiments.

FIG. 4 is a diagram illustrating a process for transparently connecting processes in accordance with some embodiments. Process 400 starts with a first process (the "connecting process") issuing a connect request 406, and a second process (the "listening process") listening 402 for connections at a particular port. The shim library for the listening process (the "listening shim library") detects the listening 402 (e.g., intercepts a listen( ) call by the listening process) and, in response, generates 404 a nonce and associates the nonce with the port. In some other embodiments, the listening process associates the nonce with the port. The shim library for the connecting process (the "connecting shim library") intercepts the connect request 406 and forwards 408 the connect request to the listening process. The listening process accepts 410 the connect request 406 at the listened-to port. The listening shim library intercepts the acceptance 410, and forwards the acceptance 412 to the connecting process. The connecting process, during the connect attempt, also checks if a nonce has been associated with the port. Here, a nonce has been associated with the listen-to (and eventual connected-to) port, and the connecting process records the associated nonce. The connection between the connecting process and the listening process is now established.

The connecting process sends its first data 414 to the listening process, which the listening shim library intercepts and forwards 416 to the listening process. The connecting process includes the nonce in the first data 414 if the connecting process had detected and recorded the nonce associated with the connected-to port. Otherwise, the first data 414 does not include the nonce. If the first data 414 includes the nonce, the augmented communications service is used for communications from the connecting process to the listening process. If the first data 414 does not include the nonce, conventional inter-process communications (e.g., communications in kernel space) is used for communications from the connecting process to the listening process.

After the listening process receives the first data 414 from the connecting process, the listening process sends its first data 418 to the connecting process, which the connecting shim library intercepts and forwards to the connecting process. If the first data 414 included the nonce, the listening process includes the nonce in the first data 418. Otherwise, the first data 418 does not include the nonce. If the first data 418 includes the nonce, the augmented communications service is used for communications from the listening process to the connecting process. If the first data 418 does not include the nonce, conventional inter-process communications (e.g., communications in kernel space) is used for communications from the listening process to the connecting process.

In some embodiments, if the augmented communications service is not used for either direction of communication (connecting process to listening process or listening process to connecting process), the augmented communications service is not used for both directions; the entire connection becomes a conventional inter-process communications connection. For example, if the nonce is sent in one direction but not the other, the entire connection falls back to being a conventional inter-process communications connection.

As illustrated in FIG. 4, the connecting process sends its first data 414 and the listening process receives the first data 414 before the listening process sends its first data 418. If the listening process sends its first data 418 before it receives the connecting process first data 414, the augmented communications service is not used; the first data 418 would not include the nonce because the listening process did not receive the nonce from the connecting process in the first data 414. In some other embodiments, the reverse applies (the connecting process receives the listening process first data 418 before sending its first data 414, otherwise the augmented communications service is not used).

Figure 5:
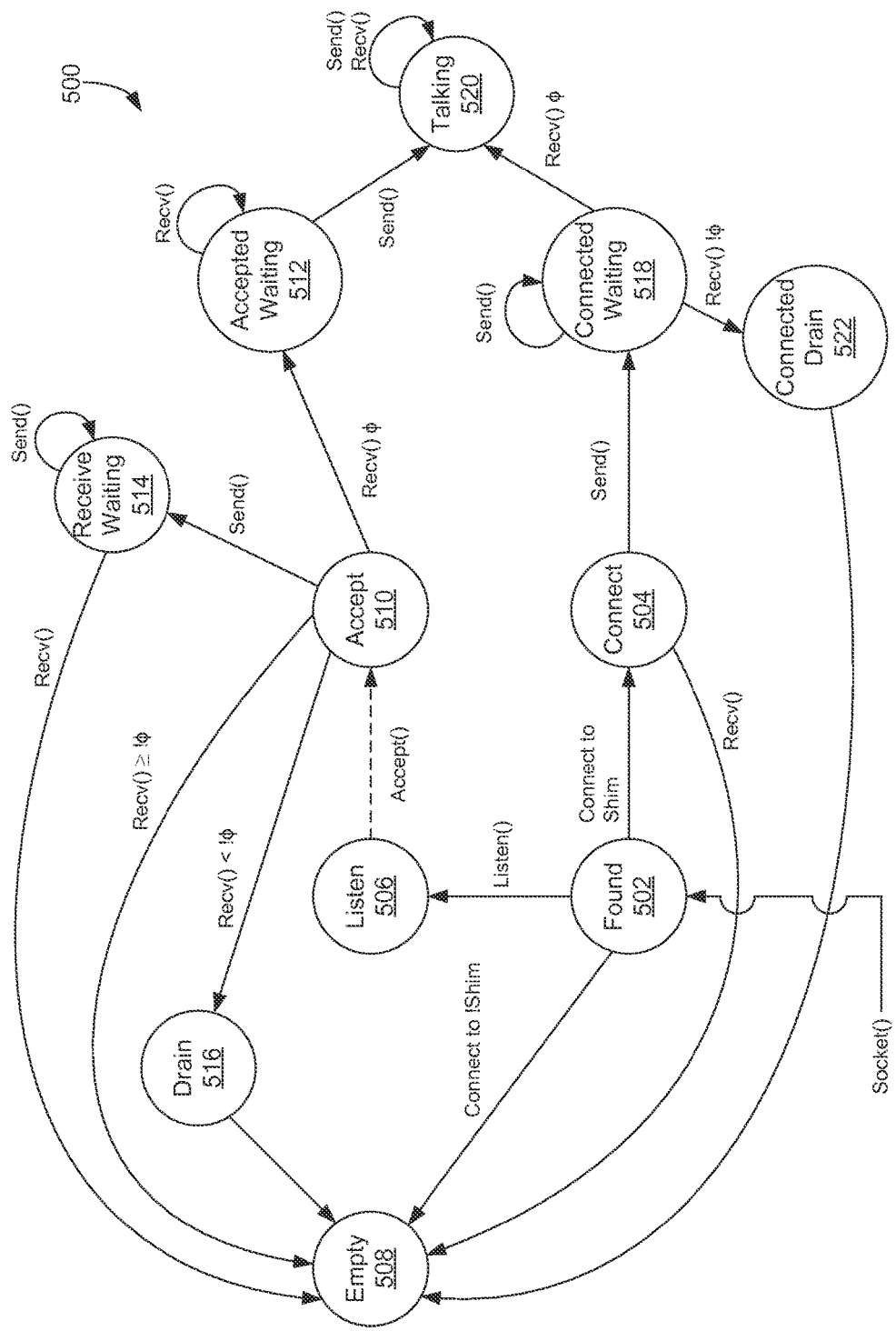
FIG. 5 is a state diagram for a shim library process in accordance with some embodiments.

FIG. 5 illustrates a state diagram for a shim library process in accordance with some embodiments. State diagram 500 illustrates the states of a process of the shim library 216 as the process of the shim library 216 attempts to determine whether a connection between processes will use the augmented communications service. Depending on whether the process of the shim library 216 is running at the computer 102 of the connecting process or the listening process (and thus intercepting the calls of the connecting process or the listening process, respectively), the process of the shim library 216 enters into different paths in diagram 500, and state diagram 500 illustrates the different paths.

A process of the shim library 216 enters into an initial Found state 502 when the shim library process detects a socket call (e.g., "Socket( )"). From the Found state 502, the shim library process intercepts calls from the connecting or listening process. If the shim library process intercepts a connect request from a connecting process, the shim library process moves into the Connect state 504 (e.g., the connecting shim library process, FIG. 4). If the shim library intercepts a listen call from a listening process for listening for a connection, the shim library process moves into the Listen state 506 (e.g., the listening shim library process, FIG. 4). If the shim library process intercepts a call other than a connect request or a listen call, the shim library moves to an Empty state 508. In the Empty state 508, the augmented communications service is not used and processes proceed conventionally.

From the Connect state 504, if the connecting shim library process intercepts a data send call from the connecting process (i.e., the connecting process sends its first data (e.g., first data 414) to the listening process), the connecting shim library process moves into the Connected Waiting state 518. As described in FIG. 4 above, the first data 414 includes the nonce if the connected process detects and records the nonce associated with the connected-to port, and does not include the nonce if the connected process did not detect the nonce. From the Connect state 504, if the connecting shim library process intercepts a data receive call from the connecting process (i.e., the connecting process is receiving the first data (e.g., first data 418) from the listening process), the connecting shim library process moves into the Empty state 508; the first data 418 does not include the nonce because the listening process has not received the nonce from the connecting process.

From the Connected Waiting state 518, the connecting shim library process intercepts data send calls and data receive calls from the connecting process. If the connecting shim library process intercepts a data send call (i.e., the connecting process is sending more data to the listening process after first data 414), the connecting shim library process stays at the Connected Waiting state 518; the additional sent data is held as "in-flight" by the augmented communications service. If the connecting shim library process intercepts a data receive call from the connecting process (i.e., the connecting process is receiving data from the listening process), and the received data (e.g., first data 418) does not include the nonce, the connecting shim library process moves into the Connected Drain state 522, where the connecting shim library process configures the connection to use conventional inter-process communications, and then moves into Empty state 508; the connecting shim library process has determined that the listening process does not use the augmented communications service. Also, when in the Connected Drain state 522, any "in-flight" data to the listening process is withdrawn from the augmented communications service and re-sent through non-augmented communications services (e.g., conventional inter-process communications methods). If the received data (e.g., first data 418) includes the nonce, the connecting shim library process moves into the Talking state 520, where the connecting shim library process intercepts data send and receive calls from the connecting process and sends and receives data using the augmented communications service in accordance with the intercepted calls.

From the Listen state 506, when the listening process accepts the connection, the listening shim library process moves into Accept state 510. From the Accept state 510, the listening shim library process moves into different states depending on what the listening shim library process intercepts next. If the listening shim library process intercepts a send call from the listening process, the listening shim library process moves into a Receive Waiting state 514. From the Receive Waiting state 514, if the listening shim library process intercepts further send calls from listening process, the listening shim library process remains at the Receive Waiting state 514. From the Receive Waiting state 514, if the listening shim library process intercepts a data receive call from the listening process, the listening shim library process moves to the Empty state 508.

From the Accept state 510, if the listening shim library process intercepts a data receive call from the listening process (i.e., the listening process is receiving the first data from the connecting process), and the received data (e.g., first data 414) includes the nonce, the listening shim library process moves to the Accepted Waiting state 512. From the Accepted Waiting state 512, if the listening shim library process intercepts further receive calls from the listening process, the listening shim library process remains at the Accepted Waiting state 512. From the Accepted Waiting state 512, if the listening shim library process intercepts a send call from the listening process, the listening shim library process moves into the Talking state 520, where the listening shim library process intercepts data send and receive calls from the listening process and sends and receives data using the augmented communications service in accordance with the intercepted calls.

From the Accept state 510, if the received data (e.g., first data 414) includes less data than the nonce (e.g., the data has less bits than the nonce), the listening shim library process moves into the Drain state 516, where the listening shim library process configures the connection to use conventional inter-process communications, and then moves into Empty state 508.

From the Accept state 510, if the received data (e.g., first data 414) includes more data than or the same amount of data as the nonce (e.g., the data has greater than or equal number of bits as the nonce) but does not include the nonce, the listening shim library process moves to the Empty state 508.

Figure 6A:
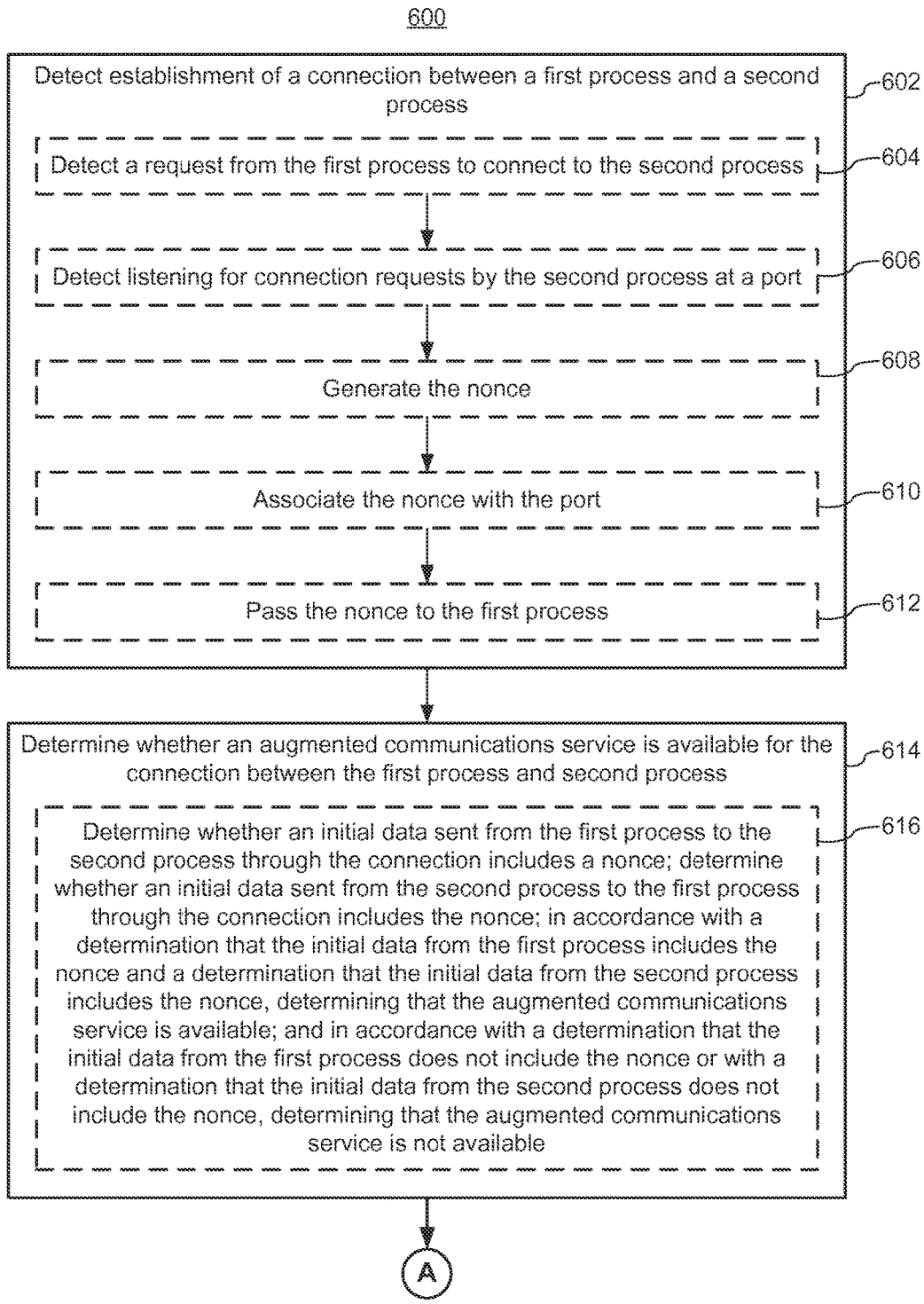
FIGS. 6A-6B are flow diagrams of a method for transparently connecting processes in accordance with some embodiments.
Figure 6B:
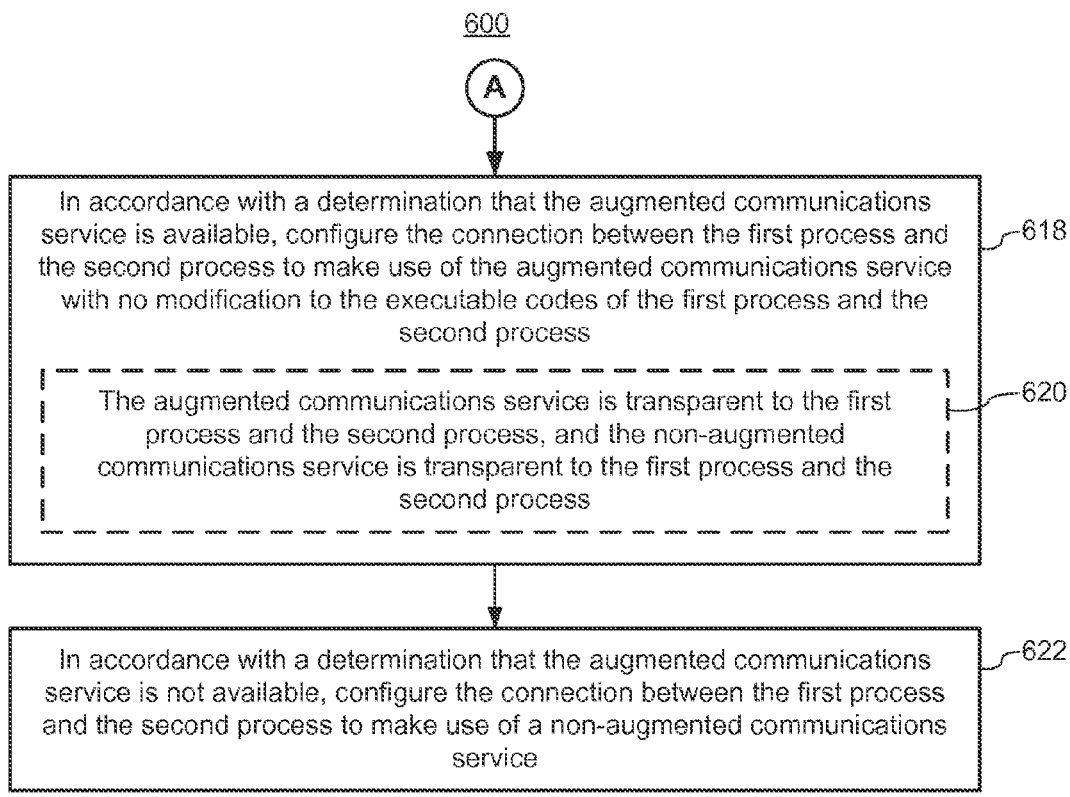

FIGS. 6A-6B are flow diagrams representing a server method 600 for of a method for transparently connecting processes in accordance with some embodiments, according to certain embodiments of the invention. Method 600 is, optionally, governed by instructions that are stored in a computer readable storage medium and that are executed by one or more processors of one or more computers. Each of the operations shown in FIGS. 6A-6B optionally corresponds to instructions stored in a computer memory or computer readable storage medium. The computer readable storage medium may include a magnetic or optical disk storage device, solid state storage devices such as Flash memory, or other nonvolatile memory device or devices. The computer readable instructions stored on the computer readable storage medium are in source code, assembly language code, object code, or other instruction format that is interpreted by one or more processors.

The computer(s) detect (602) establishment of a connection between a first process and a second process. For example, the connecting and listening shim library processes detect that a connecting and a listening process are establishing a connecting (e.g., with connect request 406 and listening call 402).

The computer(s) determine (614) whether an augmented communications service is available for the connection between the first process and second process. The connecting and listening shim library processes determine, from whether the first data 414 and first data 418 includes the nonce, whether the augmented communications service is to be used for the connection.

In accordance with a determination that the augmented communications service is available, the computer(s) configure (618) the connection between the first process and the second process to make use of the augmented communications service with no modification to the executable codes of the first process and the second process. If the determination is that the augmented communications service is to be used for the connection, the connection is configured to use the augmented communications service; the shim library processes intercept communications from the connecting and listening processes and pass the intercepted communications to the augmented communications module 218, which exchange the communications through the augmented communications service (e.g., through shared memory space 106 in user space 304).

In accordance with a determination that the augmented communications service is not available, the computer(s) configure (622) the connection between the first process and the second process to make use of a non-augmented communications service. If the determination is that the augmented communications service is to be used for the connection, the connection is configured to use conventional inter-process communications (e.g., in kernel space 306).

In some embodiments, detecting establishment of a connection between a first process and a second process includes detecting (604) a request from the first process to connect to the second process, detecting (606) listening for connection requests by the second process at a port, generating (608) the nonce, associating (610) the nonce with the port, and passing (612) the nonce to the first process. For example, the connecting and listening shim library processes detect a connect request from the connecting process and a listening call, for connections at a port, from the listening process. The listening shim library process generates a nonce and associates the nonce with the port. The nonce is passed to the connecting process after the connect request is accepted.

In some embodiments, determining whether an augmented communications service is available for a connection between the first process and second process includes (616): determining whether an initial data sent from the first process to the second process through the connection includes a nonce; determining whether an initial data sent from the second process to the first process through the connection includes the nonce; in accordance with a determination that the initial data from the first process includes the nonce and a determination that the initial data from the second process includes the nonce, determining that the augmented communications service is available; and in accordance with a determination that the initial data from the first process does not include the nonce or with a determination that the initial data from the second process does not include the nonce, determining that the augmented communications service is not available. For example, if both the first data 414 and the first data 418 include the nonce, the connection is configured to use the augmented communications service. If either the first data 414 or the first data 418 does not include the nonce, the connection is configured to use conventional inter-process communications. In some other embodiments, if one of the first data 414 or the first data 418, but not the other, includes the nonce, the connection is configured to use the augmented communications service for the direction of data communication that included the nonce (e.g., if first data 414 includes the nonce but first data 418 doesn't, then communications from the connecting process to the listening process uses the augmented communications service, and communications in the opposite direction uses conventional inter-process communications).

In some embodiments, the augmented communications service is (620) transparent to the first process and the second process, and the non-augmented communications service is transparent to the first process and the second process. The connecting process and the listening process, when establishing the connection or communicating, is unaware whether the augmented communications service is being used or not. The connecting process and the listening process communicate as if conventional inter-process communications is being used. The connecting and listening shim library processes intercept the communications and exchange the communications on behalf of the connecting and listening processes through the augmented communications service or conventional inter-process communications, depending on the determination as described above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for performing a communication service, the method comprising:
   receiving a first connection request from a first resource;
   receiving a first portion of data relating to the first connection request;
   identifying that the first resource does not support augmented communications;
   establishing the first communication session with the first resource by a second resource, wherein the second resource communicates with the first resource using program code located within kernel space at the second resource after the first communication session is established;
   receiving a second connection request from a third resource;
   receiving a first portion of data relating to the second connection request;
   identifying that the third resource supports augmented communications; and
   establishing the second communication session, wherein the second communication session is established between the second resource and the third resource, and the second resource communicates with the third resource using program code located within user space at the second resource.

2. The method of claim 1, wherein the communications between the second resource and the third resource include inter-process communications according to the program code located within the user space at the second resource when the second resource is operating in an augmented communications mode.

3. The method of claim 2, further comprising the second resource transitioning to a non-augmented communications mode, wherein the second resource executes program code out of the kernel space when communicating with the third resource after transitioning to the non-augmented communications mode.

4. The method of claim 2, wherein at least a portion of the user space program code is located in a shared memory space.

5. The method of claim 1, wherein the identifying that the third resource supports augmented communications is based on a library process executing at the third resource that corresponds to a library process executing at the second SOUC.

6. The method of claim 5, wherein the library process executing at the second resource sends at least a nonce to the third resource and the library process executing at the third resource sends the nonce to the second resource.

7. A non-transitory computer readable storage medium having embodied thereon a program executable by a processor for performing a communication service, the method comprising:
receiving a first connection request from a first resource;
receiving a first portion of data relating to the first connection request;
identifying that the first resource does not support augmented communications;
establishing the first communication session with the first resource by a second resource, wherein the second resource communicates with the first resource using program code located within kernel space at the second resource after the first communication session is established;
receiving a second connection request from a third resource;
receiving a first portion of data relating to the second connection request;
identifying that the third resource supports augmented communications; and
establishing the second communication session, wherein the second communication session is established between the second resource and the third resource, and the second resource communicates with the third resource using program code located within user space at the second resource.

8. The non-transitory computer readable storage medium of claim 7, wherein the communications between the second resource and the third resource include inter-process communications according to the program code located within the user space at the second resource when the second resource is operating in an augmented communications mode.

9. The method of claim 8, the program further executable to transition to a non-augmented communications mode, wherein the second resource executes program code out of the kernel space when communicating with the third resource after transitioning to the non-augmented communications mode.

10. The non-transitory computer readable storage medium of claim 8, wherein at least a portion of the user space program code is located in a shared memory space.

11. The non-transitory computer readable storage medium of claim 7, wherein the identifying that the third resource supports augmented communications is based on a library process executing at the third resource that corresponds to a library process executing at the second resource.

12. The non-transitory computer readable storage medium of claim 11, wherein the library process executing at the second resource sends at least a nonce to the third resource and the library process executing at the third resource sends the nonce to the second resource.

13. A system for performing a communication service, the system comprising:
a first resource;
a second resource; and
a third resource, wherein each of the first resource and the second resource communicate over a computer network, and a processor at the second resource:
receives a first connection request from the first resource;
receives a first portion of data relating to the first connection request;
identifies that the first resource does not support augmented communications;
establishes the first communication session with the first resource;
communicates with the first resource using program code located within kernel space at the second resource after the first communication session is established;
receives a second connection request from a third resource;
receives a first portion of data relating to the second connection request;
identifies that the third resource supports augmented communications; and
establishes the second communication session, wherein the second communication session is established between the second resource and the third resource, and the second resource communicates with the third resource using program code located within user space at the second resource.

14. The system of claim 13, wherein the communications between the second resource and the third resource include inter-process communications according to the program code located within the user space at the second resource when the second resource is operating in an augmented communications mode.

15. The system of claim 14, further comprising the second resource transitioning to a non-augmented communications mode, wherein the second resource executes program code out of the kernel space when communicating with the third resource after transitioning to the non-augmented communications mode.

16. The system of claim 14, wherein at least a portion of the user space program code is located in a shared memory space.

17. The system of claim 13, wherein the identifying that the third resource supports augmented communications is based on a library process executing at the third resource that corresponds to a library process executing at the second SOUC.

18. The system of claim 17, wherein the library process executing at the second resource sends at least a nonce to the third resource and the library process executing at the third resource sends the nonce to the second resource.

* * * * *